United States Patent [19]
Chow

[11] 3,791,718
[45] Feb. 12, 1974

[54] WIDEBAND TRAVELING-WAVE MICROSTRIP MEANDER-LINE LIGHT MODULATOR

[75] Inventor: Kungta K. Chow, Sunnyvale, Calif.

[73] Assignee: The United States of America as represented by the Secretary of the Navy, Washington, D.C.

[22] Filed: Nov. 21, 1972

[21] Appl. No.: 308,644

[52] U.S. Cl............................................. 350/160 R
[51] Int. Cl.............................................. G02f 1/26
[58] Field of Search ........................ 350/160, 96 WG

[56] References Cited
UNITED STATES PATENTS

| | | | |
|---|---|---|---|
| 3,393,954 | 7/1968 | Enderby et al................... | 350/160 R |
| 3,290,619 | 12/1966 | Geusic et al..................... | 350/160 R |
| 3,304,428 | 2/1967 | Peters.............................. | 350/160 R |
| 3,653,744 | 4/1972 | Comstock et al................ | 350/160 R |

Primary Examiner—William L. Sikes
Attorney, Agent, or Firm—R. S. Sciascia; P. Schneider; E. LaRoche

[57] ABSTRACT

A traveling-wave electro-optical light modulator comprises an electro-optical crystal wafer with electrodes on the top and bottom surfaces and a high reflectivity coating covering the side surfaces except for two predetermined areas. A beam of light enters the crystal through one of these areas, is reflected a number of times between the two side surfaces, and leaves the crystal through the other area. The top electrode is in the form of a strip. The light beam passes under the strip once during each reflection. The strip lies on the crystal surface in such a manner that the traveling-wave impressed on the electrodes is traveling in the same direction as the light beam when modulation occurs.

6 Claims, 3 Drawing Figures

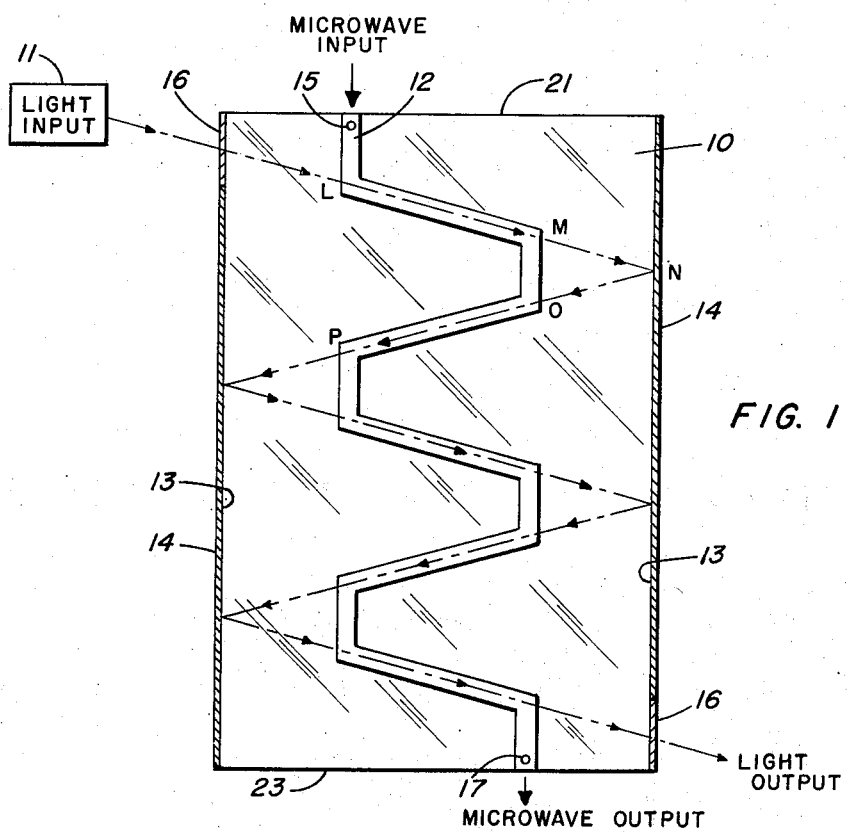
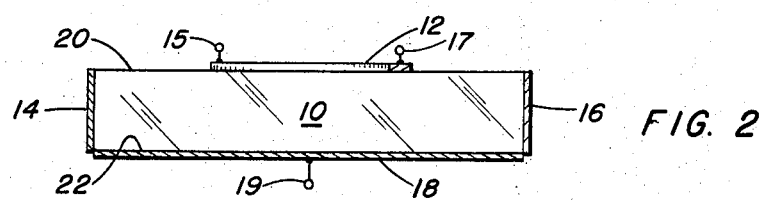
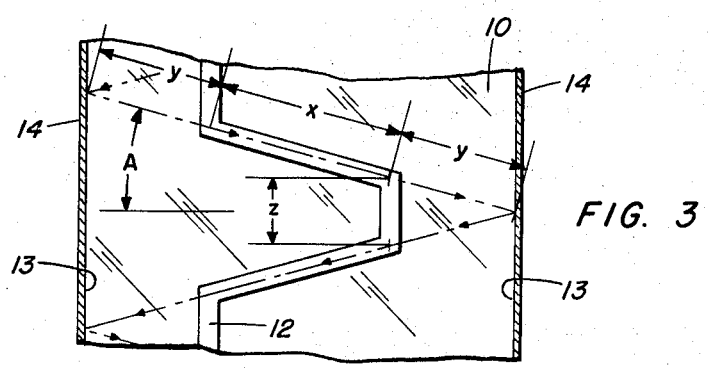

WIDEBAND TRAVELING-WAVE MICROSTRIP MEANDER-LINE LIGHT MODULATOR

BACKGROUND OF THE INVENTION

The present invention relates generally to the field of electro-optical modulators and more particularly to traveling-wave electro-optical modulators of the type wherein modulation occurs within an electro-optical crystal by means of intermittent interaction between a traveling-wave modulation potential impressed on a pair of electrodes on the surface of the crystal and a light beam.

The principle of "intermittent interaction" in a traveling-wave electro-optical modulator is described in numerous publications, such as "Electro-optical Modulators Employing Intermittent Interaction," by White et al., proceedings of the IEEE, January, 1963, pg. 214.

Briefly stated, if a light beam is allowed to travel a long distance through an electro-optical modulator medium at the same velocity as a low level modulation signal, a large depth of modulation can be achieved with low modulation power input. However, this ideal is not attainable because the bulk phase velocity ratios for light and for the modulation signal are different in electro-optical material. For example, for KDP (potassium dihydrogen-phosphate) the bulk phase velocity ratios are 0.68 for light and 0.22 for a traveling-wave modulation signal. Because of the different velocities, in order to achieve the large depth of modulation with a low power modulation signal it is necessary to provide synchronism between the light wave and the traveling-wave so that a plurality of individual interactions will occur. This is accomplished by causing the two waves to travel along different paths. Interaction occurs only at discrete points where the two paths intersect. Constructive cumulative interaction will occur if at each point of interaction the phase of the modulation signal acting on the electro-optical material is the same as that of the modulation already impressed on the light beam.

Certain prior art devices attempt to solve the synchronization problem by employing a straight strip line and segmented electro-optical crystals. This results in short interaction lengths, a large number of optical interfaces, mechanical complexity and unreliability. Another prior art approach has been to employ a straight strip line and to pass the light beam under the line a number of times. This method is unsatisfactory because the light beam and modulation wave are not traveling in the same direction during the modulation interactions and because the interaction length is short.

SUMMARY OF THE INVENTION

The present invention achieves wideband, high depth modulation of the light beam with a low power signal by utilizing a meandering strip line under which the light beam is caused to pass a plurality of times. The strip line is disposed so that the traveling-wave is traveling in the same direction as the light beam when the interaction occurs. The light beam is reflected at an angle between the two side surfaces of the electro-optical crystal. During part of the time that the light beam is passing from one side to the other, it passes under the strip line which is disposed on the surface of the crystal in the same direction as the light beam is traveling.

The invention allows the use of a single electro-optical crystal while providing a relatively long interaction length, as well as providing for interaction to occur when both waves are traveling in the same direction.

OBJECTS OF THE INVENTION

An object of the invention is to provide a traveling-wave electro-optical modulator which achieves high depth, wideband modulation with a low power traveling-wave input.

Another object of the invention is to provide a wideband traveling-wave electro-optical modulator which achieves phase and direction synchronized intermittent interaction in a single crystal.

Other objects, advantages and novel features of the invention will become apparent from the following detailed description of the invention when considered in conjunction with the accompanying drawings.

BRIEF DESCRIPTION OF THE DRAWINGS

FIG. 1 shows a top view of the preferred embodiment of the invention.

FIG. 2 shows a front view of the embodiment of FIG. 1.

FIG. 3 shows the relationships between the various dimensions of the preferred embodiment of the invention.

DESCRIPTION OF THE PREFERRED EMBODIMENT

Referring to FIGS. 1 and 2, 10 reprsents a substrate of electro-optical crystal, such as KPD or $LiNbO_3$, in the form of a wafer. The crystal has top and bottom parallel faces 20 and 22, respectively; parallel side surfaces 13, back surface 21; and front surface 23. The designation of particular surfaces as top, bottom, etc., has no reference to any operational position (the invention can be used in any spatial orientation) but are used for descriptive purposes only. Deposited on top surface 20 is a meandering strip line electrode 12 having an input terminal 15 and an output terminal 17. Deposited on the bottom surface 22 is a ground electrode 18 which has input and output terminals, only output terminal 19 being shown in FIG. 2. On part of side surfaces 13 there is a high reflectivity coating 14 which covers all of the surfaces except small areas at either end. These areas have deposited on them an anti-reflectivity coating 16.

The light beam to be modulated is directed from light source 11, which may be a laser, into the interior of crystal 10 through one of the side surfaces at one end of the crystal having anti-reflectivity coating 16. As shown by the dashed line, the light beam enters the crystal at an angle of less than 90° to the length dimension of the crystal, the length dimension being from back surface 21 to front surface 23. The term length, as well as width (side-to-side) dimension and height (top-to-bottom dimension), is used here merely for descriptive purposes and not to indicate relative sizes of the various dimensions. The light beam is reflected from side to side within the crystal by high reflectivity coatings 14 until the beam reaches the end of the crystal and exits through the side surface area having anti-reflecting coating 16 on it. Strip line 12 is deposited on the upper surface 20 of the crystal with sections LM and OP over the light beam and parallel to it. A traveling-wave modulation potential is applied between terminal 15 and the ground electrode 18. As the wave travels down the strip line it interacts with the light beam as it travels along portions LM and OP. Since modulation begins at point L, the two waves are in perfect synchronization only at that point and begin to lose synchronization as they travel along path LM. As will be further described below, the length of LM is determined by the maximum phase difference considered allowable during modulation. At point M, the direction of the strip line changes and section MO lies in the length direction. The light beam travels along path MNO while the traveling wave travels along shorter path MO. The difference in the lengths of the paths compensates for the different velocities of propagation of the waves and allows the waves to be in synchronization at point O. The traveling wave further modulates the light beam as they travel from point O to point P. This additional modulation is additive with the original modulation since the phase of the traveling wave along OP is the same as that of the modulation impressed along LM. This process is repeated throughout the modulator.

Referring to FIG. 3, a method of computing the strip line dimensions and the distance from the sides will be demonstrated.

When the optical wave reaches the end of the segment (as at M in FIG. 1) the wave front will be ahead of the microwave front by a distance $\Delta x$ given by $$\Delta x = x - ( x \cdot vm/vo ) \times x ( 1 - vm/vo ) \quad (1)$$

where $x$ is the length of the segment; $vm$ is the velocity of propogation of the microwave in the crystal; $vo$ is the velocity of propogation of the optical wave in the crystal.

Phase slippage $\Delta\Theta$ at a point along the segment is given by $$\Delta\Theta = (2\pi/\lambda rf) \cdot \Delta x = (2\pi/\lambda rf) \cdot x ( 1 - vm/mo ) \quad (2)$$

where $\lambda rf$ is the wavelength of the microwave in the crystal.

For a crystal of $LiNbO_3$, $(vm/vo) = 0.4$. Therefore, $$\Delta\Theta = 1.2\pi x \lambda rf \quad (3)$$

Letting the allowable slippage ($\Delta\Theta$) be $\pi/4$ at 3 GHZ and solving equation (3) $x$, we find that $x = 3.80$mm.

From simple trigonometry, $$y = \frac{\left(\frac{vo}{vm} - 1\right) x}{2 \left(1 - \frac{vo}{vm} \sin A\right)} \quad (4)$$

$$Z = 2y \sin A \quad (5)$$

Setting angle $A$ equal to 10° and remembering that $x=3.80$mm and $(vo/vm)=2.5$, the solution of equations (4) and (5) are $y=5.12$mm and $z=1.77$mm.

Obviously, the present invention is not limited to the particular material or dimensions set forth above. The material used for the crystal, the allowable degree of phase slippage, the frequency of the microwave modulation signal and the angle at which the light enters the crystal are variables to be manipulated by the designer to achieve a particular result. Also, if a monochromatic light source is used, the wavelength of the light wave is a factor to be controlled by the designer. Many modifications and variations of the present invention are possible in light of the above teachings. It is therefore to be understood that, within the scope of the appended claims, the invention may be practiced otherwise than as specifically described.

What is claimed is

1. A wideband traveling-wave, electro-optical, light modulator comprising:

a single electro-optical crystal having top and bottom parallel surfaces and two parallel side surfaces, one side surface receiving light to be modulated;

means physically attached to the sides of said crystal for causing the light to reflect within the crystal between said side surfaces more than one time, so that this light remains within the crystal during the entire modulation process;

a plurality of sections of electrically conductive material connected together to form a conductive strip disposed on the top surface of said crystal in a shape such that each of at least two of said sections of electrically-conductive material are disposed on the top surface, each over a different section of the light path through said crystal in parallel direction with the light path;

a ground electrode of electrically conductive material disposed on the bottom surface of said crystal and covering at least that area which is directly opposite to said conductive strip;

means for impressing a traveling-wave modulation potential on said conductive strip such that light traveling on the path-sections over which the sections of electrically conductive material are disposed, will be cumulatively modulated by said traveling-wave modulation potential; and means for transmitting the modulated light from the body of said crystal.

2. The light modulator of claim 1 wherein:

said crystal has a front and a back; and said plurality of conductive sections are comprised of first sections which lie in a front-to-back direction and second sections which lie at an angle to said first sections and connect said first sections with each other.

3. The light modulator of claim 2 wherein only said second sections are disposed over sections of the light path.

4. The light modulator of claim 3 wherein:

at least one of said first sections is disposed on the top surface a first predetermined distance from one side of the crystal; and, at least one of said first sections is disposed on the top surface a second predetermined distance from the other side of said crystal.

5. The light modulator as in claim 4 wherein:

the first predetermined distance is equal to the second predetermined distance and further wherein;

the length of each of said second sections being determined by the maximum phase difference tolerable between the light wave and the traveling-wave modulation potential during modulation.

6. The light modulator as in claim 1 wherein said means for causing the light to reflect is a high reflectivity coating covering all of the surfaces of said crystal except for small areas at either end for the entry and exit of the light.

* * * * *